United States Patent
Korada et al.

(10) Patent No.: US 11,958,350 B2
(45) Date of Patent: Apr. 16, 2024

(54) ELECTRIC VEHICLE BATTERY PACK HAVING LONGITUDINAL REINFORCEMENTS

(71) Applicant: Rivian IP Holdings, LLC, Plymouth, MI (US)

(72) Inventors: Ajay Korada, Lake Orion, MI (US); Vignesh Sekar, Canton, MI (US); Randy R. Frank, Dearborn, MI (US); Piyush Khater, Canton, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 107 days.

(21) Appl. No.: 17/470,969

(22) Filed: Sep. 9, 2021

(65) Prior Publication Data

US 2023/0031269 A1 Feb. 2, 2023

Related U.S. Application Data

(60) Provisional application No. 63/226,734, filed on Jul. 28, 2021.

(51) Int. Cl.
*B60K 1/04* (2019.01)
*B60L 50/60* (2019.01)
*B60L 50/64* (2019.01)

(52) U.S. Cl.
CPC ............ *B60K 1/04* (2013.01); *B60L 50/64* (2019.02); *B60L 50/66* (2019.02); *B60K 2001/0438* (2013.01)

(58) Field of Classification Search
CPC ... B60K 1/04; B60K 2001/0438; B60L 50/64; B60L 50/66
See application file for complete search history.

(56) References Cited

U.S. PATENT DOCUMENTS

2018/0337377 A1* 11/2018 Stephens ............. H01M 50/224

* cited by examiner

*Primary Examiner* — Jason D Shanske
*Assistant Examiner* — James J Triggs
(74) *Attorney, Agent, or Firm* — HALEY GUILIANO LLP

(57) ABSTRACT

An electric vehicle battery pack with a reinforced cover to better support vehicle cabin loads such as seat submerge loads, seat pitch loads, and the like. The cover has a number of reinforcing members affixed thereto and positioned over cross members of the battery pack frame. Loads imposed by the cabin are thus transferred to the reinforcing members and then to the rigid cross members. In this manner, battery packs of embodiments of the disclosure better support cabin loads applied thereto, improving their strength and better protecting more delicate components within the battery pack.

20 Claims, 12 Drawing Sheets

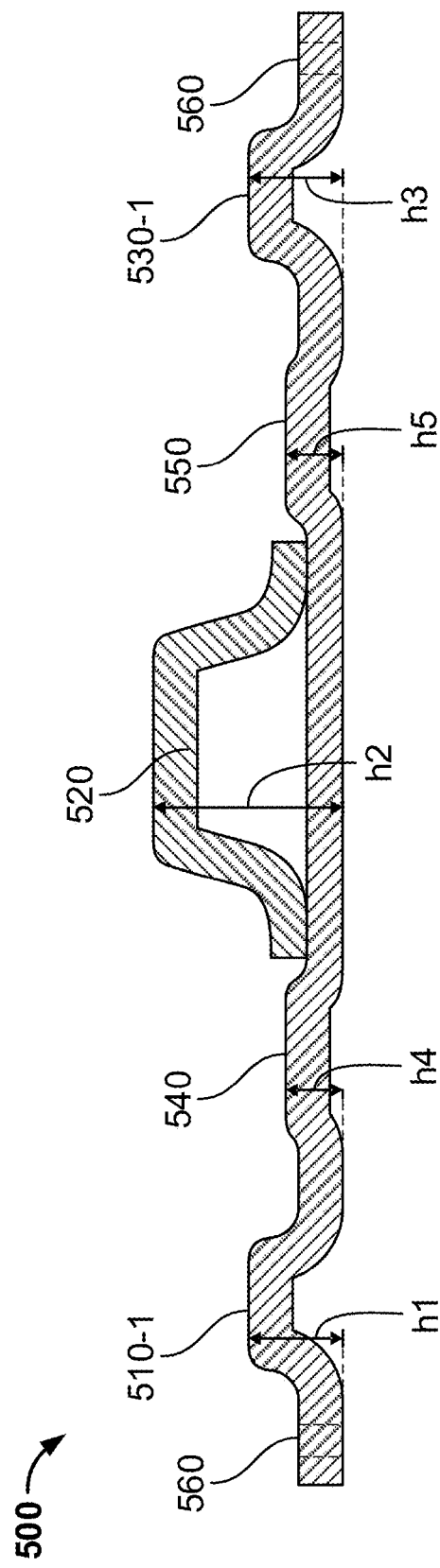

ELECTRIC VEHICLE BATTERY PACK HAVING LONGITUDINAL REINFORCEMENTS

CROSS REFERENCE TO RELATED APPLICATION

This application claims priority to, and the benefit of, U.S. Provisional Patent Application No. 63/226,734, filed Jul. 28, 2021, the disclosure of which is hereby incorporated by reference herein in its entirety.

INTRODUCTION

The present disclosure is directed generally to electric vehicle battery packs. More specifically, the present disclosure is directed to electric vehicle battery packs having longitudinal reinforcements.

SUMMARY

Vehicle battery packs perform a number of functions, including providing a protective enclosure to withstand crashes, ground strikes, or other impacts, routing of electrical wires, and containment of battery fires. Battery packs present design challenges for electric vehicles, however. As one example, battery packs often are not strong enough to support certain vehicle loads. When located under vehicle cabins, conventional battery packs are often susceptible to damage from loads such as seat submerge pressure, seat pitch, and the like.

Accordingly, systems and methods are described herein for a battery pack with a reinforced lid or cover that better withstands loads from, e.g., vehicle cabins. In some embodiments of the disclosure, a number of longitudinal reinforcing members are affixed atop a battery pack cover. The reinforcing members can span multiple cross members of the battery pack, and may be affixed to these cross members in addition to the lid. Seats or other vehicle cabin structures may overlie the reinforcing members when the battery pack is installed. In this manner, loads resulting from seat weight, seat deformation such as seat submerges, seat pitch, and the like are transferred through mounting points of the cabin to the reinforcing members, and in turn to the rigid cross members of the battery pack. Accordingly, loads upon the battery pack are transferred to rigid elements of the battery pack rather than flexible elements such as the cover or sensitive elements such as the battery modules, improving the strength and loadbearing capacity of the battery pack.

To ensure that loads or the energy therefrom are properly transferred from the reinforcing members to the cross members of the battery pack, the cross members may be designed in some embodiments of the disclosure as tall cross members that extend from the bottom of the battery pack up to at least the top of the battery pack frame. In other words, the cross members that bear cabin loads may be sufficiently tall that cover elements such as reinforcing members may be coupled thereto, in any manner that allows for transferring of loads to the cross members rather than the battery modules of the battery pack, thus protecting them from compressive loads imposed on the battery pack by, e.g., the vehicle cabin.

As the reinforcing members are designed to support cabin loads imposed by various cabin structures, in some embodiments of the disclosure at least a portion of the vehicle cabin may contact the reinforcing members, to create a load path extending directly from the cabin to the battery pack cross members. More specifically, vehicle cabins may be designed with mounting points allowing the battery pack to be mounted in the vehicle such that the reinforcing members of the battery pack contact the cabin mounting points.

The reinforcing members may be affixed to the lid or cover in any manner. For example, the reinforcing members may be steel or other metallic members affixed to the cover by welds, bolts, screws, an adhesive, or the like. In some embodiments of the disclosure, additional support members may be affixed under the reinforcing members on the underside of the battery pack cover, to aid in securing the reinforcing members and provide a more direct load path to the battery pack cross members. Reinforcing members may be any other rigid material having sufficient strength, such steel, metallic members, composite material, or the like.

To increase the strength of the reinforcing members and improve load paths, reinforcing members may each extend over at least two different battery pack cross members, so that loads on each reinforcing member are distributed to at least two cross members. In some embodiments of the disclosure, reinforcing members may be affixed to their underlying cross members such as by bolts, screws, or welds, further increasing their strength and improving their load paths.

In some embodiments of the disclosure, covers may include raised portions that form ridges or other raised elements that increase the bending stiffness of the cover and thereby improve its strength and manufacturability. In particular, increased cover bending stiffness allows for more reliable gripping by robots or other handlers during battery pack assembly.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 11 is a simplified cross-sectional view of an exemplary battery pack cover constructed in accordance with further embodiments of the disclosure, taken along section A-A of FIG. 10A.

DETAILED DESCRIPTION

In one embodiment, the disclosure relates to an electric vehicle battery pack with longitudinal reinforcements to better support vehicle cabin loads such as seat submerge loads, seat pitch loads, and the like. The cover has a number of reinforcing members affixed thereto and positioned over cross members of the battery pack frame. Loads imposed by the cabin are thus transferred to the reinforcing members, which in turn transfer the loads to the rigid cross members. In this manner, battery packs of embodiments of the disclosure better support cabin loads applied thereto, improving their strength and better protecting more delicate components within the battery pack.

Figure 1:
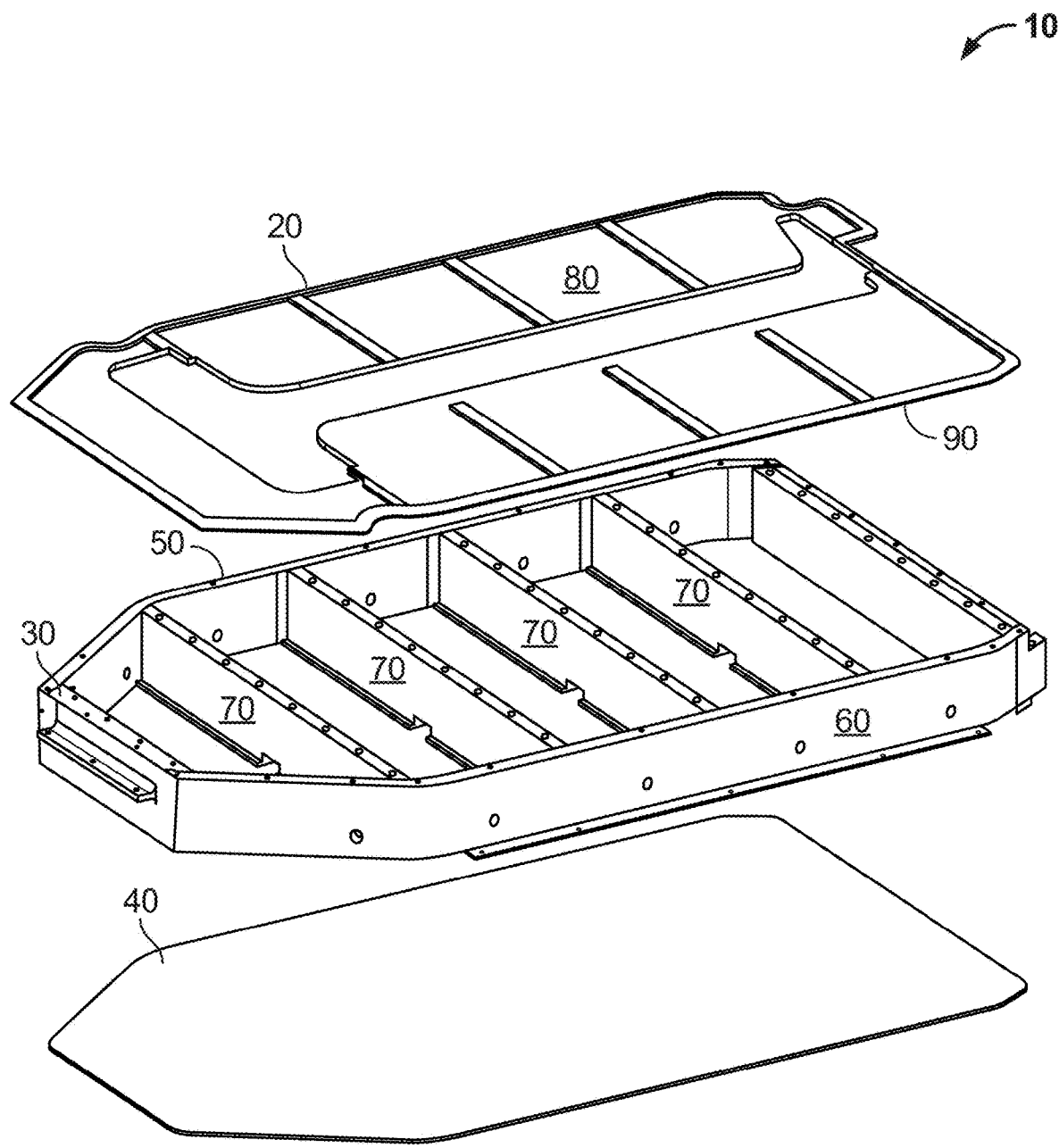
FIG. 1 is an isometric exploded view of an exemplary battery pack constructed in accordance with some embodiments of the disclosure.

FIG. 1 is an isometric exploded view of an exemplary battery pack constructed in accordance with some embodiments of the disclosure. Here, an electric vehicle battery pack 10 includes a cover 20 or lid, frame 30, and strike shield 40. The cover 20 and strike shield 40 are affixed to opposing sides, e.g., top and bottom surfaces, of the frame 30 to collectively define spaces within the frame 30 for receiving and protecting a number of battery modules and other electrical elements that provide power for an electric vehicle.

Frame 30 may be constructed with opposing sides or walls 50, 60 that have a number of cross members 70 extending therebetween for added strength and rigidity. Frame 30 may be made of any sufficiently rigid, strong and non-flammable material, such as a metal, e.g., an extruded aluminum, a steel, or the like, or any composite material.

Cover 20 may be any generally flat structure that provides sufficient heat resistance and structural rigidity to support reinforcing members as further described below. For example, cover 20 may be constructed of a metal such as a stamped aluminum or steel sheet, a molded plastic, a composite material, or the like. Cover 20 may have an upper surface 80 that faces the cabin of the vehicle within which battery pack 10 is installed, and an opposite lower surface 90 that faces the frame 30 and interior of the battery pack 10.

Figure 2:
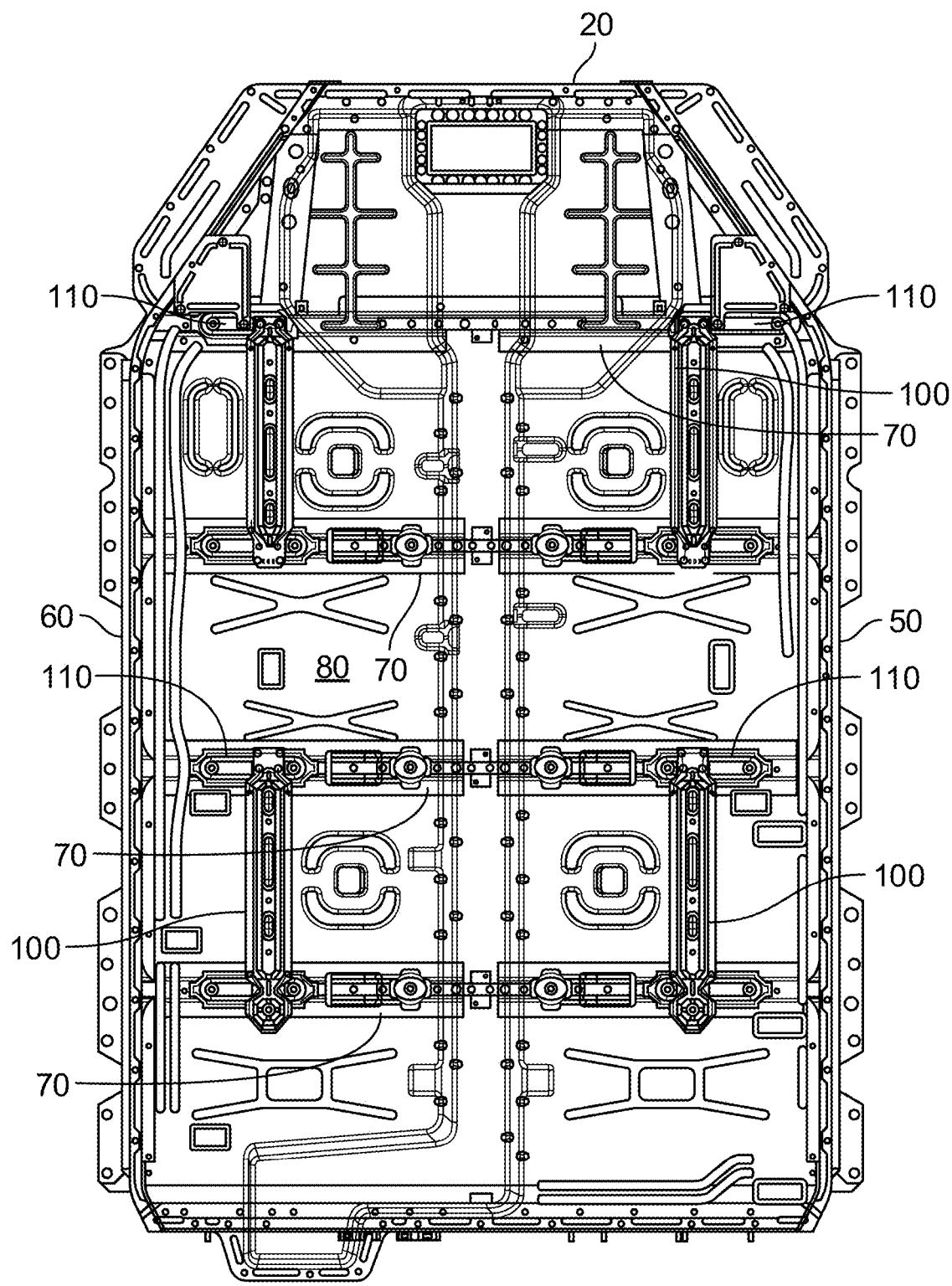
FIG. 2 is a plan view of a battery pack cover and reinforcing members constructed in accordance with some embodiments of the disclosure.

FIG. 2 is a plan view of a battery pack cover and reinforcing members constructed in accordance with some embodiments of the disclosure. In the view of FIG. 2, cover 20 is shown placed over frame 30. Here, upper surface 80 of cover 20 may have a number of longitudinal reinforcing members 100 thereon, and lower surface 90 may have a number of lateral support members 110 thereon. In some embodiments of the disclosure, longitudinal reinforcing members 100 may be affixed to the upper surface 80 of cover 20 such as by bolts, welds, adhesive, or in any other suitably secure manner. Similarly, lateral support members 110 may be affixed to the lower surface 90 of cover 20, also by bolts, welds, adhesive, or in any other suitably secure manner.

In the exemplary embodiment shown, longitudinal reinforcing members 100 extend between adjacent cross members 70 of frame 30, so that each end of a reinforcing member 100 lies over, and is supported by, a cross member 70. Lateral support members 110 extend underneath ends of their respective longitudinal reinforcing members 100 and along underlying cross members 70. The longitudinal reinforcing members 100 are positioned to align with mounting points or other contact points on the underside of a vehicle cabin, so that loads from the cabin are transferred to the longitudinal reinforcing members 100 rather than another portion of upper surface 80. The longitudinal reinforcing members 100 then transfer these loads to the rigid cross members 70 such that cross members 70 support compressive forces upon battery pack 10, rather than any components within.

Figure 3:
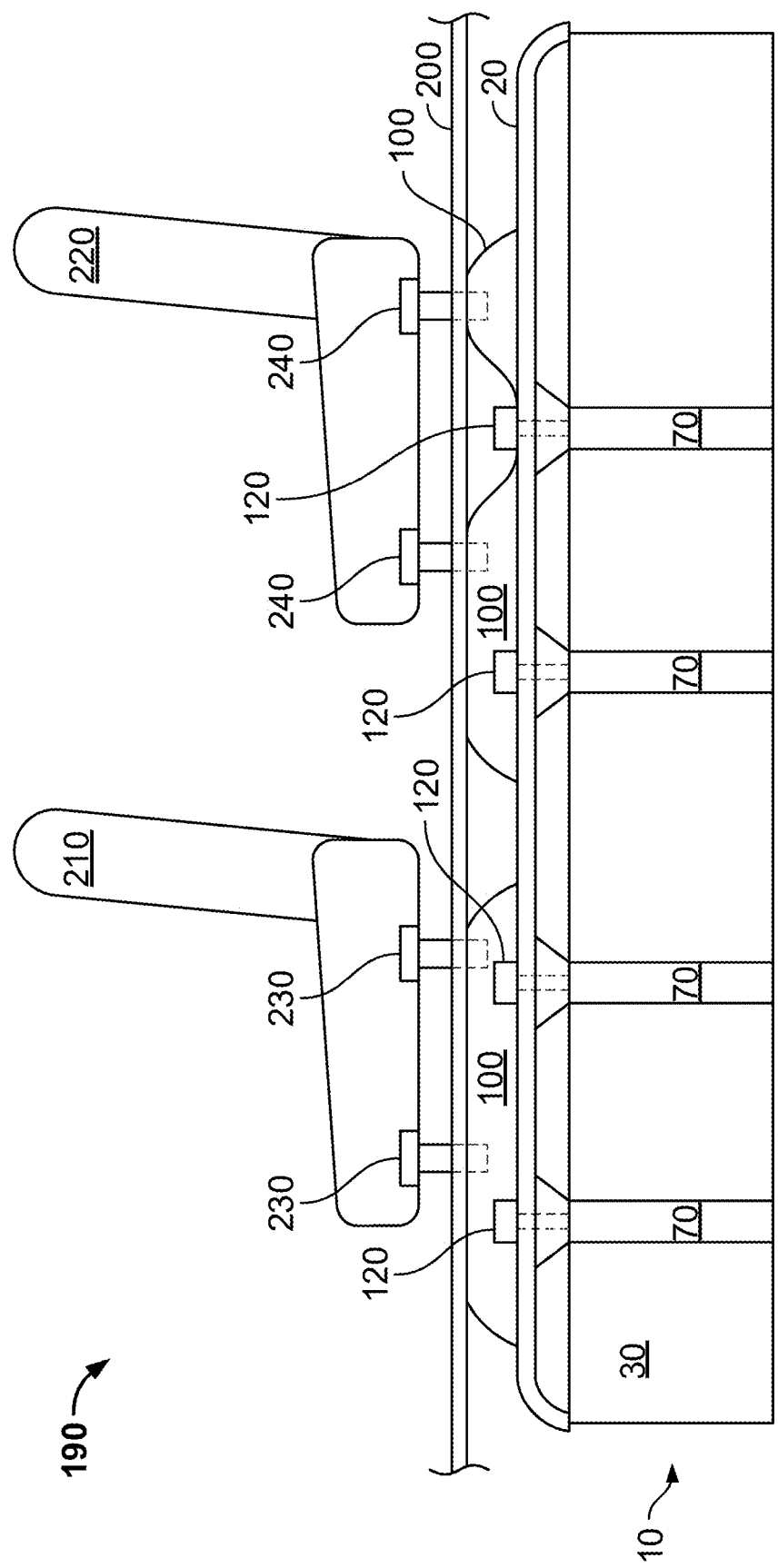
FIG. 3 is a cutaway side view of a vehicle cabin and battery pack constructed in accordance with some embodiments of the disclosure.

With reference to FIG. 3, operation of a battery pack 10 having longitudinal reinforcing members 100 is now shown. FIG. 3 is a cutaway side view of a vehicle cabin and battery pack constructed in accordance with some embodiments of the disclosure. Battery pack 10 is affixed to the underside of a vehicle, in part by affixing the battery pack 10 to a chassis of the vehicle. As shown, the underside of vehicle cabin 190 is also attached to battery pack 10. More specifically, longitudinal reinforcing members 100 of battery pack 10 are affixed to a floor panel 200 of cabin 190, such as via bolts 230 and 240 of seats 210 and 220 respectively. Longitudinal reinforcing members 100 may have features for aligning with mounting points of the floor panel 200 or another intermediate structure, to facilitate proper placement of the battery pack 10 with respect to floor panel 200. Battery pack 10, as above, has longitudinal reinforcing members 100 affixed to its cover 20 and to cross members 70 of its frame 30 by, e.g., bolts 120.

Longitudinal reinforcing members 100 may be affixed to any portion of cabin 190, in any manner. In some embodiments, members 100 and seats 210, 220 may both be bolted to floor panel 200 via bolts 230, 240. This provides direct load paths from seats 210, 220 to longitudinal reinforcing members 100, which may be desirable to direct loads onto longitudinal reinforcing members 100 rather than, for example, floor panel 200. In other embodiments, members 100 may be bolted or otherwise affixed to other structures placed between floor panel 200 and members 100, and/or between seats 210, 220 and floor panel 200. Members 100 may also be affixed to any portion of cabin 190 in any manner besides via bolts 230, 240, such as by welding or application of adhesive to floor panel 200 or any other structure. That is, seats 210, 220 and members 100 may be affixed to any portion of cabin 190 in any manner allowing transfer of loads from, for example, seats 210, 220 to longitudinal reinforcing members 100 rather than to another portion of the battery pack 10.

Accordingly, loads from seats 210, 220, such as submerging loads acting to push seats 210, 220 down in the view of FIG. 3 and toward floor panel 200, or pitching loads acting to tilt seats 210, 220 forward or backward, are transferred through bolts 230, 240 to longitudinal reinforcing members 100 of battery pack 10. The longitudinal reinforcing members 100 substantially transfer these loads via bolts 120 to cross members 70, rather than other portions of battery pack 10.

Figure 4:
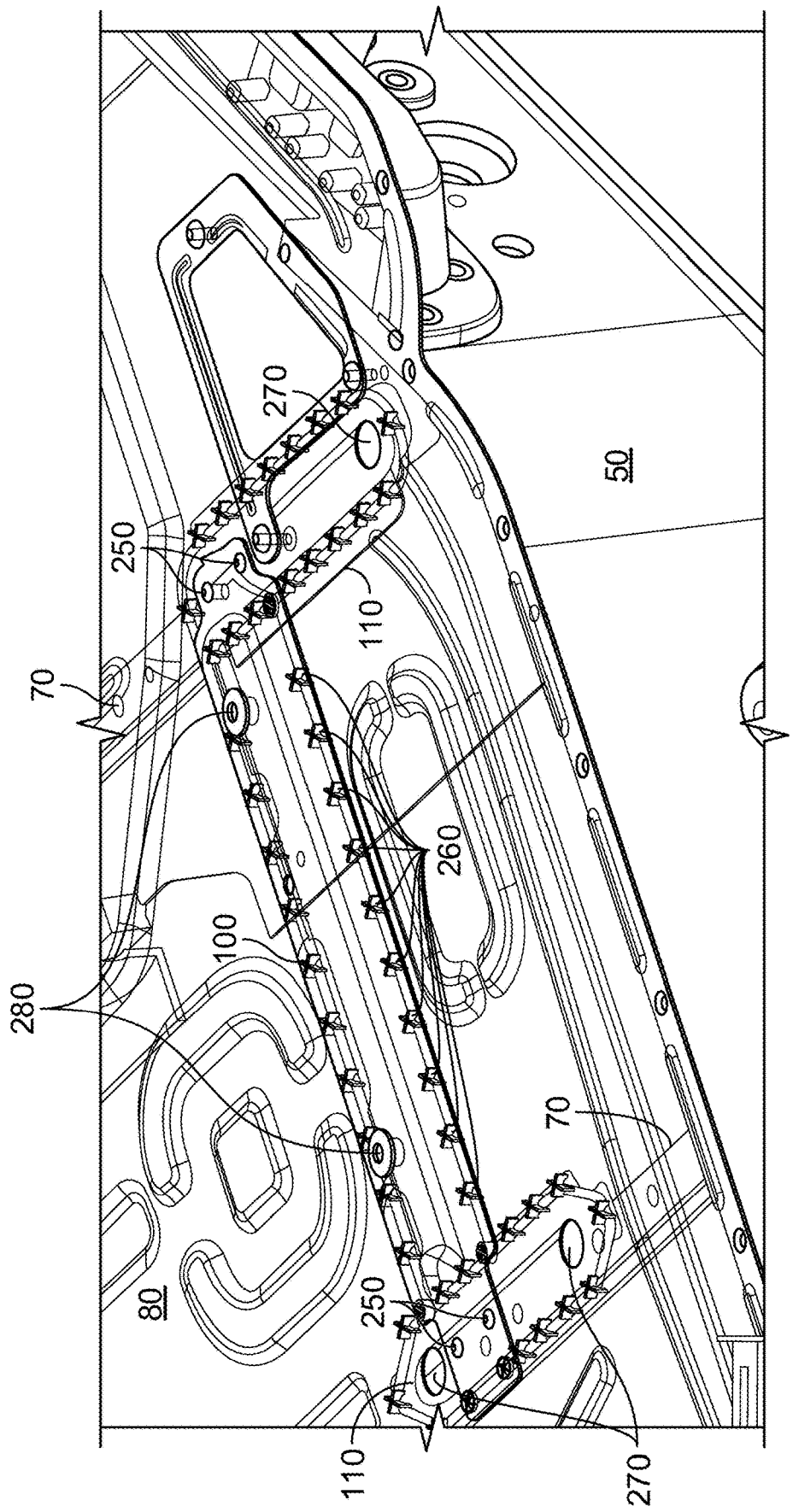
FIG. 4 is an isometric closeup view of battery pack reinforcing members constructed in accordance with some embodiments of the disclosure.
Figure 5:
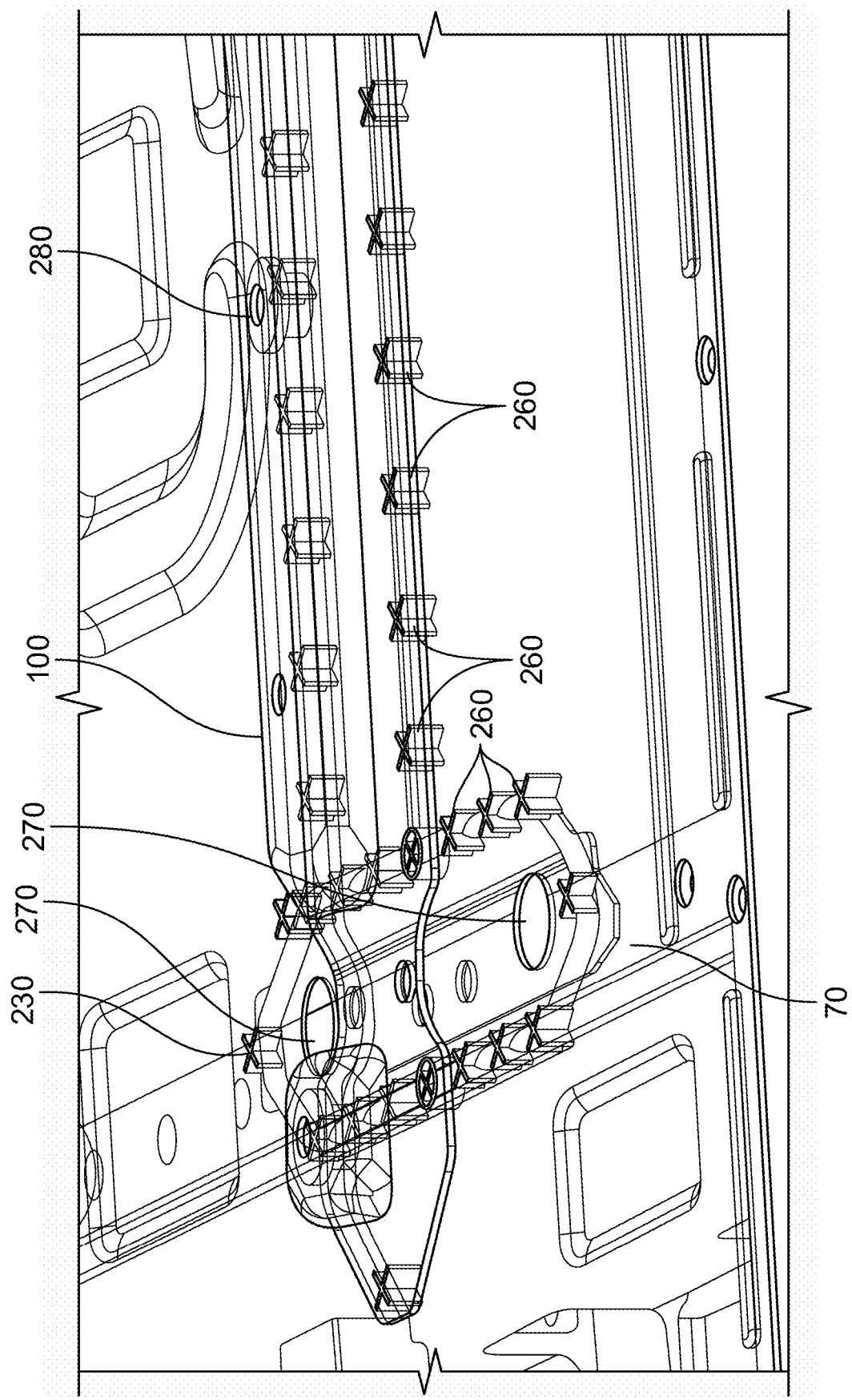
FIG. 5 illustrates further details of battery pack reinforcing members of FIG. 4, constructed in accordance with some embodiments of the disclosure.

FIG. 4 is an isometric closeup view of battery pack reinforcing members constructed in accordance with some embodiments of the disclosure, and FIG. 5 illustrates further details of battery pack reinforcing members of FIG. 4, constructed in accordance with some embodiments of the disclosure. As shown, longitudinal reinforcing members 100 may be rigid members sized such that opposite ends each overlie a cross member 70. Members 100 may have any sizes and shapes suitable for supporting loads from cabin 190 and/or seats 210, 220. In some embodiments, members 100 may have an arcuate shape in cross-section, such that the center portion containing holes 280 is raised for coupling with mounting points of, e.g., the cabin 190. The holes 280 may be sized and shaped to accept bolts 230, 240 or other fasteners for coupling members 100, and thus battery pack 10, to a vehicle. In some embodiments, members 100 may also have holes 250 formed in their ends to overlie cross members 70, the holes 250 being sized and placed to accept bolts, screws, or other fasteners for affixing the members 100 to cross members 70.

Members 100 may be affixed to upper surface 80 of cover 20 in any manner. In some embodiments, members 100 may be affixed to upper surface 80 by a number of welds, such as those that may be formed at weld points 260. Alternatively, or in addition, members 100 may be affixed to upper surface 80 by an adhesive, or by screws, bolts, other fasteners, or the like.

In some embodiments of the disclosure, support members 110 are positioned between the cover 20 and cross members 70, underneath ends of the longitudinal reinforcing members 100. In some other embodiments of the disclosure, support members 110 may be omitted, and longitudinal reinforcing members 100 and/or cover 20 may be affixed directly to cross members 70. Support members 110 may be rigid members of any size and shape suitable for coupling to cover 20, cross members 70, and/or longitudinal reinforcing members 100. In some embodiments, support members 110 may have an arcuate shape in cross-section, such that the outer edges of support members 110 are raised above the center portion containing holes 270. Holes 270 may be sized and shaped to accept fasteners such as bolts, screws, or the like, for coupling support members 110 to cross members 70. Accordingly, cover 20 may have holes overlying holes 270, so that bolts or other fasteners may be inserted through holes of cover 20, through holes 270 and into cross members 70 for securing of support members 110 and cover 20 to cross members 70.

Support members 110 may be affixed to the lower surface 90 of cover 20 by a number of welds, such as at positions indicated by weld points 260, although embodiments of the disclosure contemplate coupling of support members 110 to cover 20 in any manner, e.g., by adhesive, bolts, screws, other fasteners, or the like. In some embodiments of the disclosure, bolts or other fasteners may be employed to couple support members 110 to longitudinal reinforcing members 100 through cover 20, such as via bolts that extend through both longitudinal reinforcing members 100 and support members 110.

Figure 6:
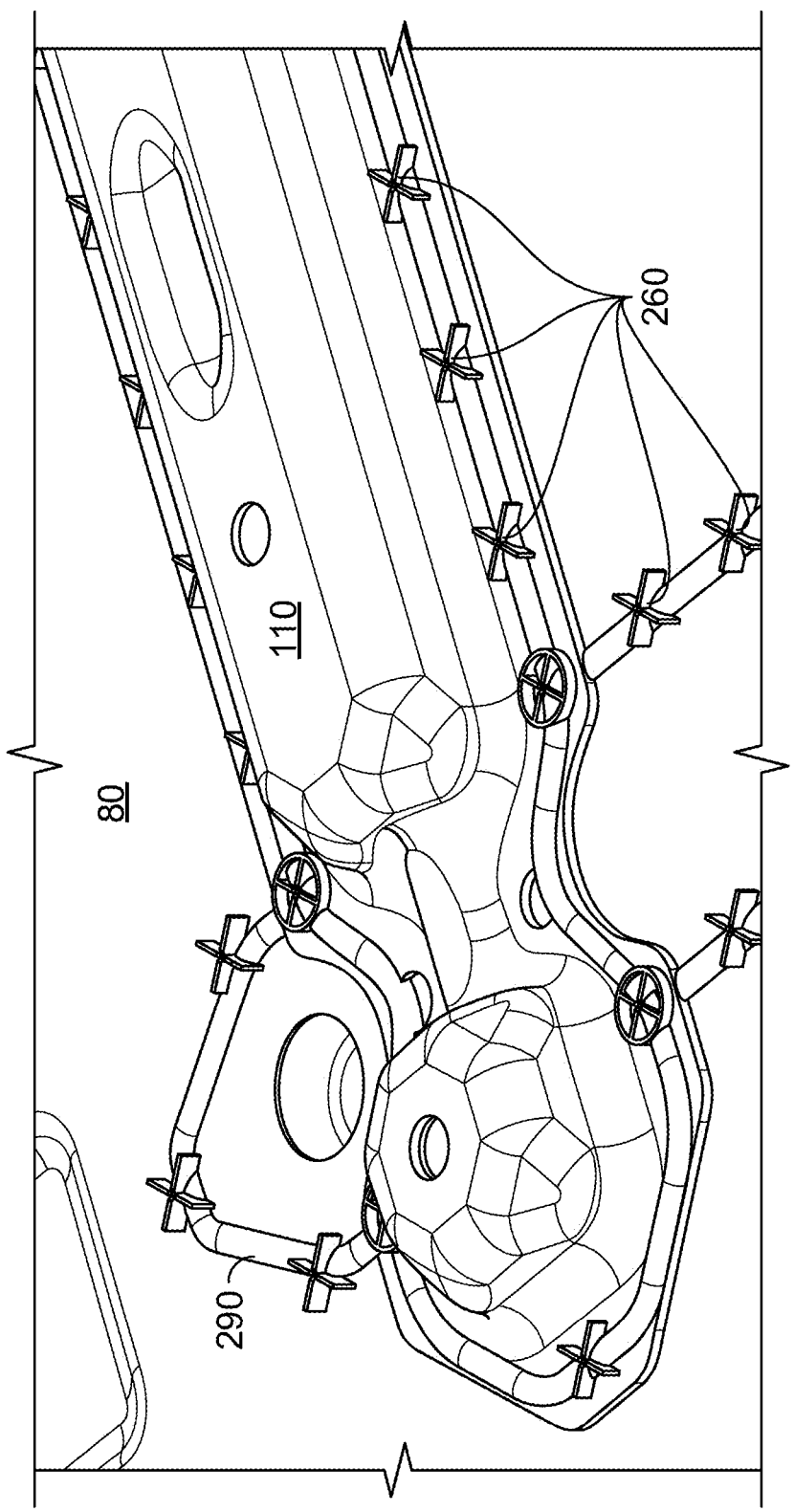
FIG. 6 is an isometric closeup view illustrating affixing of battery pack reinforcing members constructed in accordance with some embodiments of the disclosure.

FIG. 6 is an isometric closeup view illustrating affixing of battery pack reinforcing members constructed in accordance with some embodiments of the disclosure. A gasket 290 or other moisture resistant sealant may be applied to the upper surface 80 of cover 20, and a longitudinal reinforcing member 100 may be applied thereon and welded to upper surface 80 such as at weld points 260. In some embodiments, an adhesive may be applied to affix longitudinal reinforcing members 100 to upper surface 80 (instead of or in addition to welds). In such embodiments reference 290 may represent an adhesive, rather than a gasket or other sealant. In other embodiments, both a gasket or other sealant, as well as an adhesive, may be employed. The gasket/sealant and/or adhesive may be applied to both upper surface 80 and lower surface 90, to affix and/or seal both the longitudinal reinforcing members 100 as well as support members 110.

Figure 7:
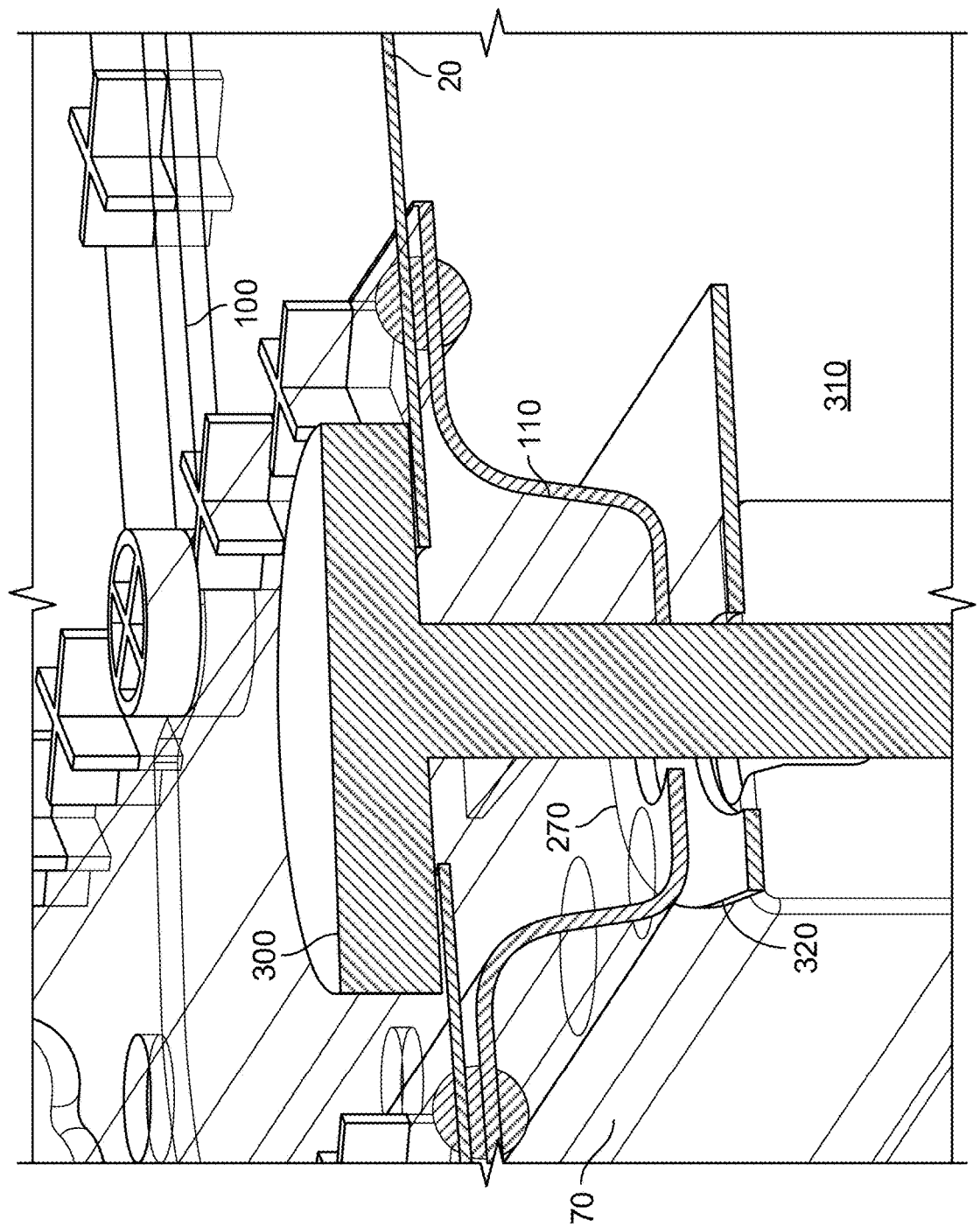
FIG. 7 is a cutaway side view illustrating the attachment of battery pack covers and reinforcing members to cross members, in accordance with some embodiments of the disclosure.

It is noted that longitudinal reinforcing members 100 and support members 110 may be affixed to cover 20, and coupled to cross members 70, in any manner. FIG. 7 is a cutaway side view illustrating the attachment of battery pack covers and reinforcing members to cross members, in accordance with some embodiments of the disclosure. As shown, longitudinal reinforcing members 100 may be affixed to cover 20 such as by welds as above. Support member 110 may also be affixed to cover 20 by welds, and additionally affixed to its underlying cross member 70 by a bolt 300 or other fastener. In some embodiments, bolt 300 may extend through cover 20 and hole 270 of support member 110, into cross member 70. In this manner, a load path is provided allowing loads on longitudinal reinforcing members 100 to be transferred through support member 110 and into cross member 70, avoiding damage to other components of battery pack 10.

Bolt 300 may also affix other components of battery pack 10 to cross members 70. For example, battery modules 310 may have flanges 320 that extend over cross members 70, between cross members 70 and support members 110. The flanges 320 may then be secured to cross members 70 by bolt 300, so that bolt 300 extends through cover 20, support member 110, flange 320, and into cross member 70. In this manner, bolt 300 may provide the additional function of securing internal battery pack 10 components, such as battery modules 310, to cross members 70.

Figure 8A:
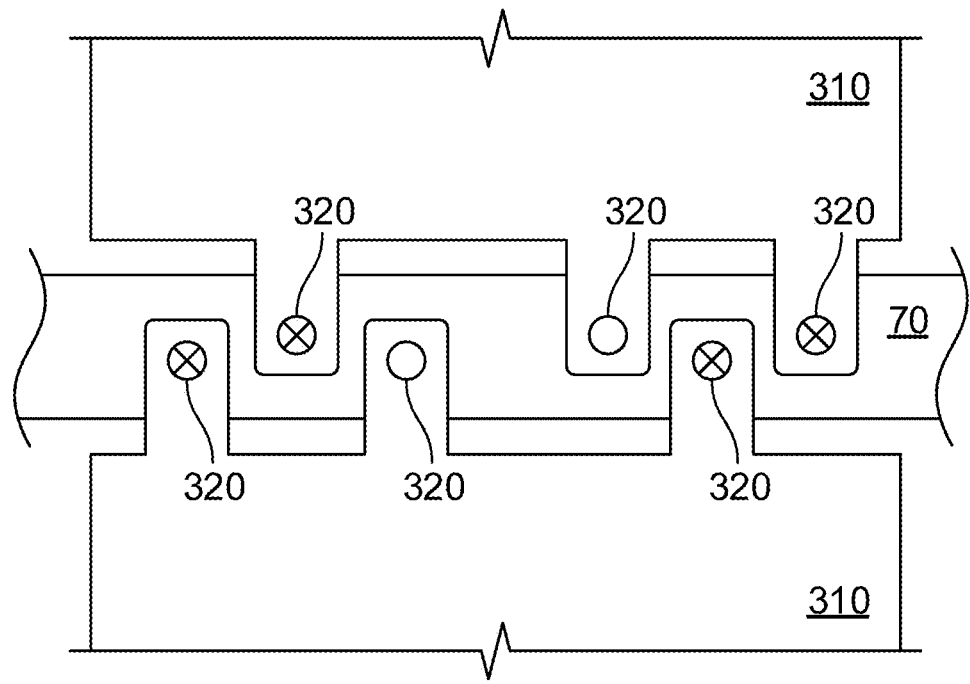
FIGS. 8A and 8B are plan views illustrating a method of affixing reinforcing members and battery modules to cross members, in accordance with some embodiments of the disclosure.
Figure 8B:
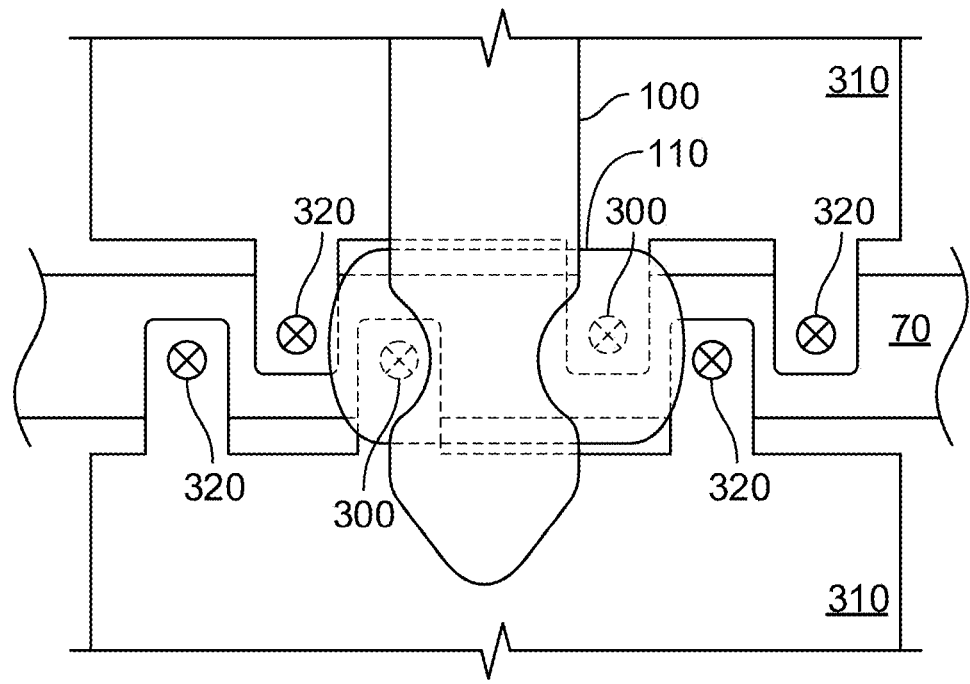

FIGS. 8A and 8B are plan views illustrating a method of affixing reinforcing members and battery modules to cross members, in accordance with some embodiments of the disclosure. In FIG. 8A, battery modules are affixed to cross member 70 by affixing flanges 320 to cross members 70. Flanges 320 may be affixed to cross members 70 in any manner, such as by bolting through bolt holes as shown. More specifically, those flanges 320 that are not used in subsequent bolting of support members 110, i.e., the two leftmost flanges 320 and two rightmost flanges 320 of FIG. 8A, are bolted or otherwise affixed to cross member 70. As shown in FIG. 8B, cover 20 and support member 110 are then bolted or otherwise affixed to both the middle two flanges 320 and the cross member 70, such as via bolts passing through cover 20, holes 270 of support member 110, the middle two flanges 320, and the upper surface of cross member 70. Longitudinal reinforcing member 100 may then be affixed to cover 20 as above. Alternatively, longitudinal reinforcing member 100 may be affixed to cover 20 prior to attachment of cover 20 to either support members 110 or frame 30.

Figure 9:
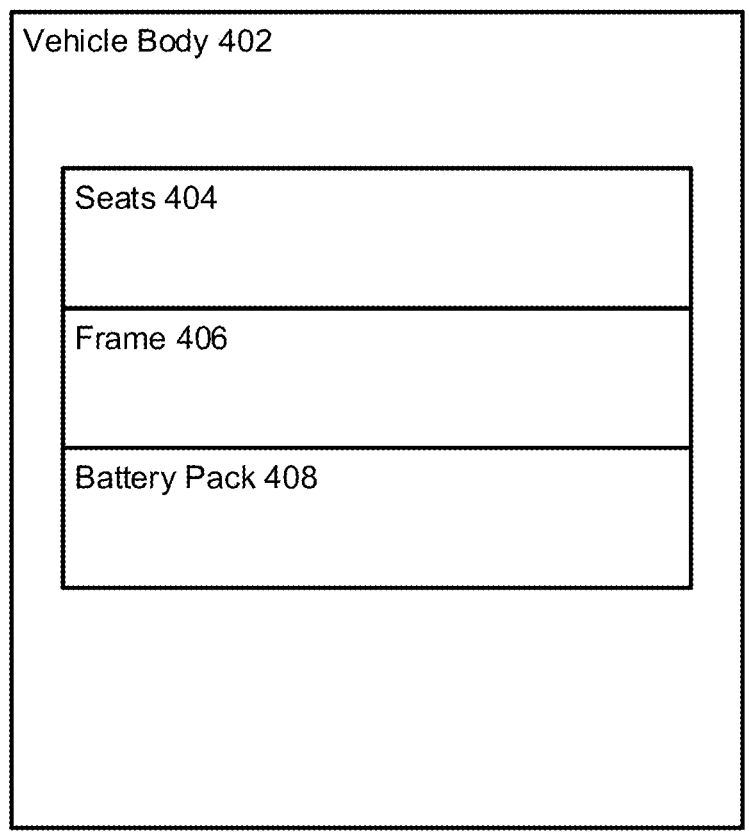
FIG. 9 is a block diagram representation of an exemplary vehicle having a battery pack constructed in accordance with some embodiments of the disclosure.

FIG. 9 is a block diagram representation of an exemplary vehicle having a battery pack constructed in accordance with some embodiments of the disclosure. In FIG. 9, an exemplary vehicle 400 is shown, which may be any vehicle, including as examples a car, truck, van, recreational vehicle, sports utility vehicle, any commercial vehicle such as a delivery vehicle, tractor-trailer or semi-trailer truck, or the like.

Vehicle 400 includes a vehicle body 602 which may include a frame or chassis 406 that may in turn support one or more seats 404, as well as a battery pack 408. As above, seats 404 may be coupled to longitudinal reinforcing members 100 of battery pack 408, so that seats 404 may apply loads to battery pack 408 through reinforcing members 100. In some embodiments of the disclosure, longitudinal reinforcing members 100 transfer load from seats 404 to cross members 70 within battery pack 408, so that loading from seats 404 is borne by structural elements such as cross members 70, rather than other more delicate or sensitive components of battery pack 408. This reduces damage to battery pack 408, increasing its safety and reliability.

Figure 10A:
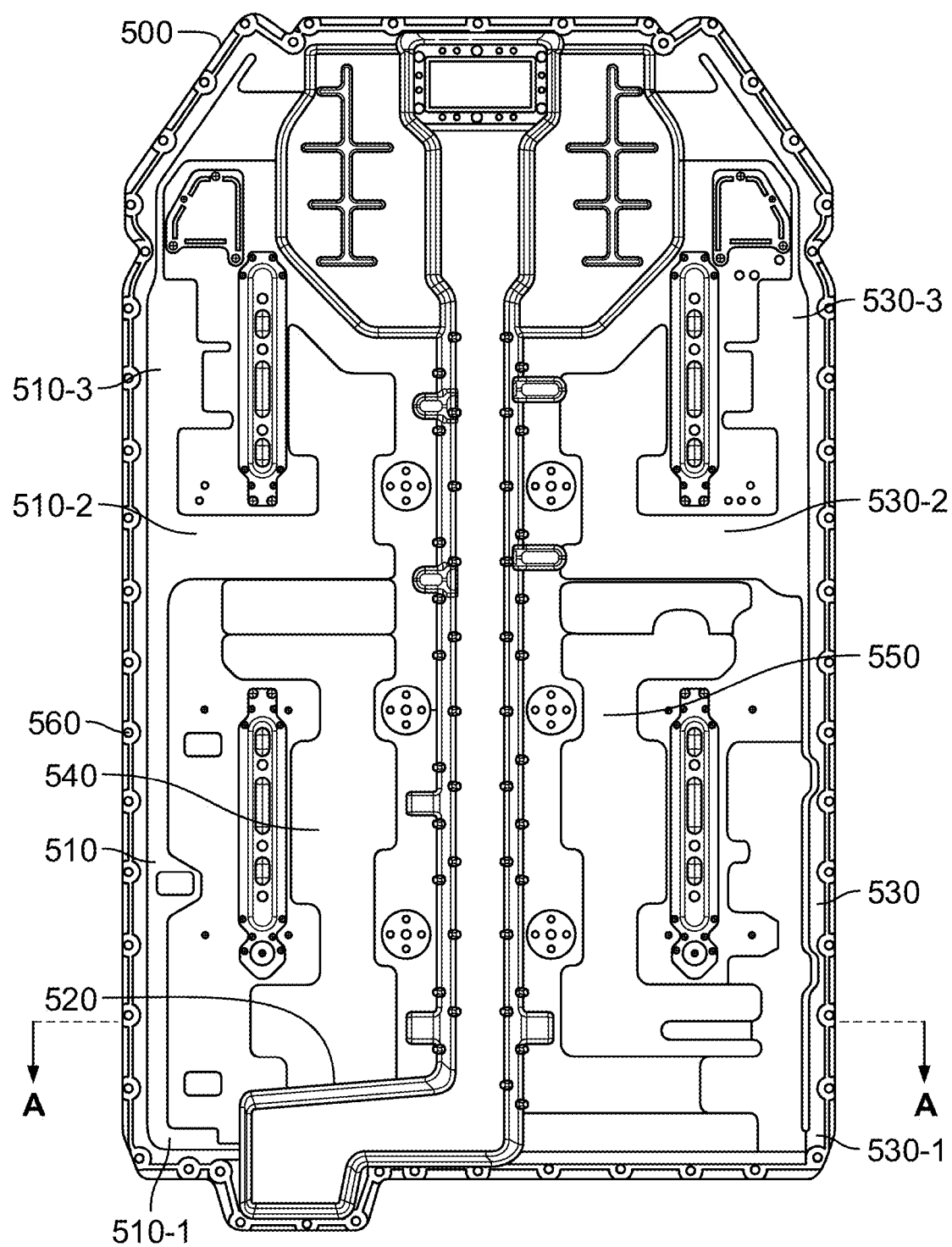
FIG. 10A is a plan view of an exemplary battery pack cover constructed in accordance with further embodiments of the disclosure.
Figure 10B:
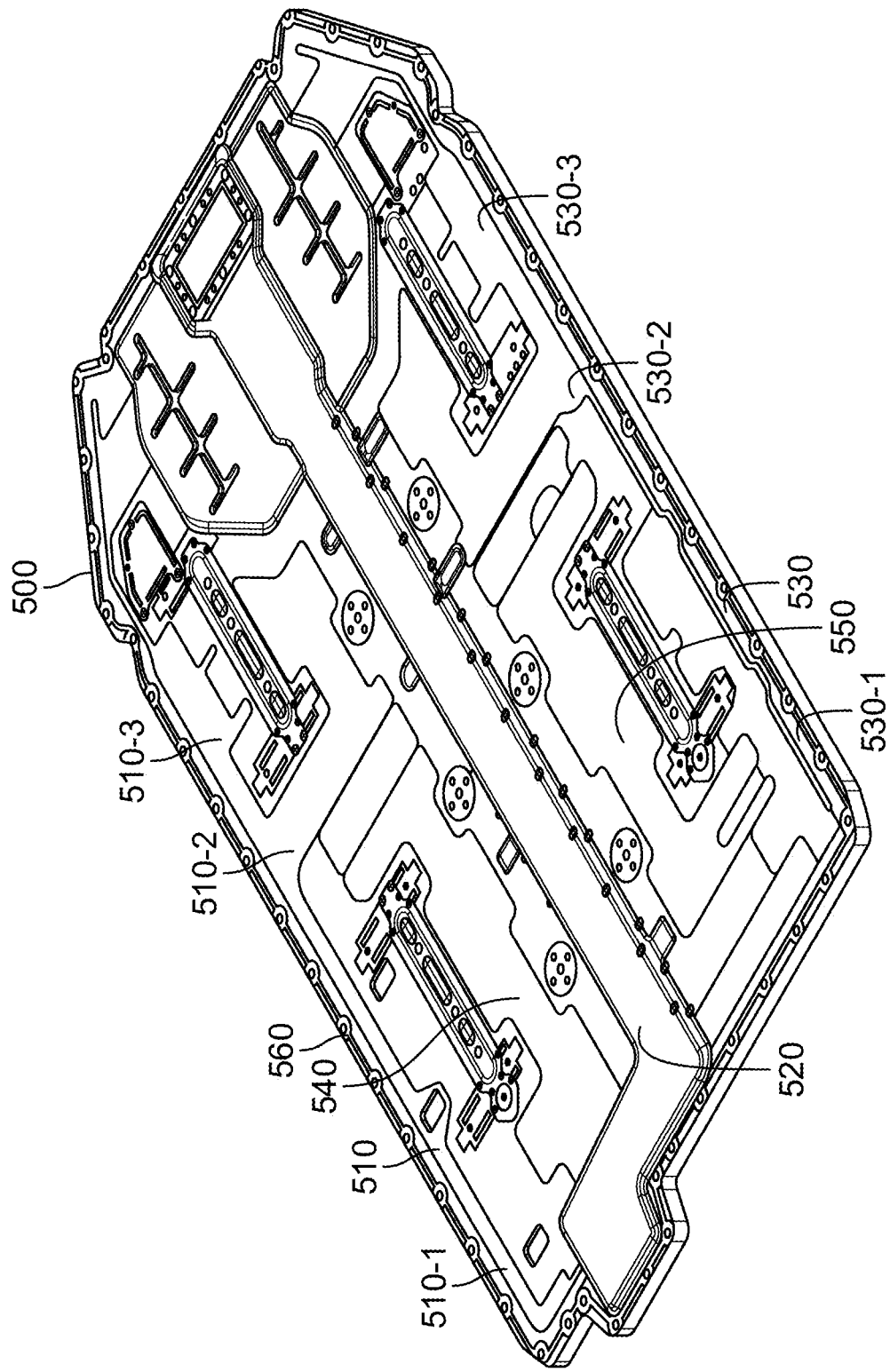
FIG. 10B is an isometric view of the exemplary battery pack cover of FIG. 10A.

FIGS. 10A and 10B are a plan view and an isometric view, respectively, of an exemplary battery pack cover or lid constructed in accordance with further embodiments of the disclosure. Here, cover 500 may be similar to cover 20 above, but may include features such as raised portions 510, 520, and 530. Raised portions 510, 520, 530 may be any elevated portions of cover 500, and may be formed in any manner. For example, in some embodiments, cover 500 may be a sheet metal cover with stamped portions 510 and 530, and a reinforcement portion 520 affixed thereto. The portions 510, 520, 530 may each extend along any portion of the length of cover 500, to increase the bending stiffness of cover 500 along its length and thus allow it to be picked up and handled more easily by, e.g., a robot, during battery pack and vehicle assembly. In some embodiments, reinforcement portion 520 may be, for example, a stamped longitudinal sheet metal piece that is bolted, welded, or otherwise affixed to the upper surface of cover 500. In other embodiments, reinforcement portion 520 may be formed integral to the cover 500, e.g., may be a stamped portion of cover 520. In some embodiments, portion 520 may extend generally longitudinally along substantially the entire length of cover 500, as shown. While the portion 520 has a longitudinal and generally rectangular shape in plan view, embodiments of the disclosure contemplate any shape which may contribute to increased bending stiffness of cover 500.

Cover 500 may further include a raised portion 510 positioned to the left of raised portion 520 in the view of FIG. 10A and extending generally longitudinally along one side of cover 500. The raised portion 510 may have any shape in plan view. In some embodiments, raised portion 510 may have a number of sections, including a section 510-1 which extends along a left lower side of cover 500 and which may have a curved portion conforming to a lower left corner of cover 500. Similarly, raised portion 510 may also include a section 510-2 which is wider than section 510-1 and extends toward portion 520 in plan view. Section 510-2 may add bending stiffness along the width of cover 500 to prevent it from bowing when handled. Section 510-2 may be positioned at any location along the length of cover 500, and its widened portion may be of any shape which acts to increase bending stiffness and prevent bowing. Raised portion 510 may further include a section 510-3 positioned above section 510-2 in the view of FIG. 10A and integrally extending therefrom, so that sections 510-1, 510-2, and 510-3 are each sections of the same unitary raised portion 510. Each of sections 510-1, 510-2, and 510-3 may have the same elevation, or may have differing elevations. Raised portion 510, including its sections 510-1, 510-2, and 510-3, may be sized and shaped to extend along any portion of the length of cover 500. In some embodiments, raised portion 510 extends along at least three quarters of the length of the cover 500, to sufficiently increase bending stiffness thereof.

Cover 500 may also include a raised portion 530 positioned to the right of raised portion 520 in the view of FIG. 10A and extending generally longitudinally along a side of cover 500. The raised portion 530 may have any shape in plan view. In some embodiments, raised portion 530 may have a number of sections, including a section 530-1 which extends along a right lower side of cover 500. Raised portion 530 may also have a section 530-2 which is wider than section 530-1 and extends toward portion 520 in plan view to add bending stiffness and prevent bowing. Raised portion 530 may further have a section 530-3 which is wider than section 530-1 but which may or may not be as wide as section 530-2. Sections 530-1, 530-2, and 530-3 may be integral extensions of each other, and may be sections of a unitary raised portion 530. Each of sections 530-1, 530-2, and 530-3 may have the same elevation, or may have differing elevations. Raised portion 530, including sections 530-1, 530-2, and 530-3, may be sized and shaped to extend along any portion of the length of cover 500. In some embodiments, raised portion 530 extends along at least three quarters of the length of the cover 500, to sufficiently increase bending stiffness thereof.

Cover 500 may include additional raised portions besides those described above, which extend longitudinally along a substantial portion of the length of cover 500 to increase bending stiffness. As one example, a raised ridge may be formed to extend along fastener holes 560. This raised ridge may be formed to have any shape, such as a longitudinal ridge extending along one side of fastener holes 560 and generally parallel to an outer edge of cover 500. The raised ridge may also, or alternatively, extend between holes 560, or in any other manner which acts to increase bending stiffness.

FIG. 11 is a simplified cross-sectional view of an exemplary battery pack cover constructed in accordance with further embodiments of the disclosure, taken along section A-A of FIG. 10A. FIG. 11 is not to scale.

As shown, raised portions of cover 500 may have various elevations. For example, raised portion 520 may have an elevation $h2$ that is greater than the elevations $h1$, $h3$ of raised portions 510-1 and 530-1, respectively. Here, elevations $h1$ and $h3$ may be equal or may differ. Embodiments of the disclosure also contemplate any number and location of additional raised portions, such as raised portions 540 and 550 having elevations $h4$ and $h5$ respectively. In some embodiments, elevations $h4$ and $h5$ may be lower or lesser than elevations $h2$ and $h3$, although this need not necessarily be the case. Indeed, any values of any elevations $h1$-$h5$ are contemplated, to increase the bending stiffness of cover 500.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, any shape or geometry or positions of longitudinal reinforcing members and support members are contemplated, so long as they act to transfer seat loading or other cabin loads to battery pack cross members rather than other battery pack components such as battery modules. Longitudinal reinforcing members and support members may also be affixed to battery pack lids/covers and cross members in any suitable manner. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A battery pack lid, the lid comprising:
a panel comprising a first side and an opposing second side, the first side configured to face a battery pack frame comprising cross members extending between opposing sides of the battery pack frame; and
a plurality of longitudinal reinforcing members affixed to the second side of the panel to extend across the cross members, wherein the plurality of longitudinal reinforcing members comprises at least one coupling that interfaces with at least one mounting point, and wherein the plurality of longitudinal reinforcing members are positioned to transfer loads to respective adjacent cross members when the panel is coupled to the battery pack frame.

2. The lid of claim 1, wherein each of the cross members extends from a floor of a battery pack to at least an upper surface area of the battery pack frame.

3. The lid of claim 1, wherein the longitudinal reinforcing members comprise steel reinforcing members welded or bolted to the panel.

4. The lid of claim 1, wherein the longitudinal reinforcing members are further configured to contact at least a portion of a cabin of an electric vehicle when the battery pack frame is coupled to the electric vehicle.

5. The lid of claim 1, further comprising support members each affixed to the first side of the panel underneath a corresponding one of the longitudinal reinforcing members.

6. The lid of claim 1, wherein each longitudinal reinforcing member is configured to extend across one or more cross members, and is further configured to be affixed to each of the one or more cross members.

7. The lid of claim 1, wherein the panel has a length, and the second side has:
a first portion extending longitudinally along the length of the panel, the first portion comprising a first elevation;
a second portion extending longitudinally along a first side of the first portion, the second portion comprising a second elevation; and
a third portion extending longitudinally along a second side of the first portion that is opposite the first side of the first portion, the third portion having a third elevation;
wherein the first elevation is greater than both the second elevation and the third elevation.

8. The lid of claim 7, wherein the second and third portions extend longitudinally along at least three quarters of the length of the panel.

9. An electric vehicle battery pack, the battery pack comprising:
a frame having opposing sides, and a plurality of cross members each extending between the opposing sides, the opposing sides configured to support at least one battery module;
a cover having a first surface facing the frame, and an opposing second surface; and
at least one reinforcing member affixed to the second surface of the cover, the at least one reinforcing member positioned to extend across one or more cross members, the at least one reinforcing member further being positioned to transfer energy from an electric vehicle cabin to respective adjacent cross members, wherein the at least one reinforcing member comprises at least one coupling that interfaces with at least one mounting point.

10. The battery pack of claim 9, wherein the at least one reinforcing member is coupled to its respective adjacent cross members through the cover.

11. The battery pack of claim 9, wherein the at least one reinforcing member is a steel reinforcing member welded or bolted to the cover.

12. The battery pack of claim 9, wherein the at least one reinforcing member is further configured to contact at least a portion of the electric vehicle cabin when the battery pack is coupled to the electric vehicle cabin.

13. The battery pack of claim 9, further comprising at least one support member affixed to the first side of the cover underneath the corresponding at least one reinforcing member.

14. The battery pack of claim 9, wherein each reinforcing member is configured to be affixed to at least two adjacent cross members.

15. The battery pack of claim 9, wherein the cover has a length, and the second surface has:
a first portion extending longitudinally along the length of the cover and having a first elevation;
a second portion extending longitudinally along a first side of the first portion, the second portion having a second elevation; and
a third portion extending longitudinally along a second side of the first portion opposite the first side of the first portion, the third portion having a third elevation;
wherein the first elevation is greater than both the second elevation and the third elevation.

16. The battery pack of claim 15, wherein the second and third portions extend longitudinally along at least three quarters of the length of the cover.

17. A vehicle, comprising:
a chassis;
a vehicle cabin comprising mounting points; and
a battery pack coupled to the chassis, the battery pack having a frame, cross members extending between opposing sides of the frame, a cover affixed to the frame, and at least one reinforcing member affixed to the cover and extending across at least two adjacent cross members, wherein the mounting points of the vehicle cabin are positioned above the at least one reinforcing member and wherein the at least one reinforcing member comprises at least one coupling that interfaces with at least one of the mounting points.

18. The vehicle of claim 17, wherein each of the cross members extends from a bottom of the frame to at least an opposing top of the frame.

19. The vehicle of claim 17, wherein the at least one reinforcing member contacts the mounting points of the vehicle cabin.

20. The vehicle of claim 17, wherein the battery pack further comprises at least one support member affixed to the cover underneath the corresponding at least one reinforcing member.

* * * * *